United States Patent

Titus et al.

[15] 3,688,909
[45] Sept. 5, 1972

[54] FLOATING SELF ADJUSTING SKIMMER

[72] Inventors: Paul E. Titus, Houston, Tex. 77034; James R. Hanson, Martinez, Calif. 94553

[73] Assignee: Shell Oil Company, New York, N.Y.

[22] Filed: June 4, 1970

[21] Appl. No.: 43,461

[52] U.S. Cl. ........................... 210/242, 210/DIG. 21
[51] Int. Cl. ................................................. C02b 9/02
[58] Field of Search .......... 210/83, 242, 523, DIG. 21

[56] References Cited

UNITED STATES PATENTS

| 2,608,300 | 8/1952 | Small | 210/242 |
| 3,219,190 | 11/1965 | Thune | 210/DIG. 21 |
| 1,591,024 | 7/1926 | Dodge | 210/DIG. 21 |
| 2,330,508 | 9/1943 | McCall | 210/242 |
| 3,259,245 | 7/1966 | Earle | 210/DIG. 21 |

*Primary Examiner*—Reuben Friedman
*Assistant Examiner*—T. A. Granger
*Attorney*—J. H. McCarthy and T. E. Bieber

[57] ABSTRACT

There is disclosed a skimming mechanism for removing all or part of a first liquid from the surface of a second liquid. A pivoted receptacle having a weir is buoyed to position the weir adjacent the interface of the liquids. Liquids accumulating in the receptacle are withdrawn for disposal. A stabilizing member extends around a substantial portion of the periphery of the skimmer to prevent submergence of the weir due to wave or current movement of the liquids.

9 Claims, 7 Drawing Figures

Patented Sept. 5, 1972

INVENTOR
PAUL E. TITUS
JAMES R. HANSON

BY *Harold L. Denkler*

ATTORNEY

INVENTOR
PAUL E. TITUS
JAMES R. HANSON

BY Harold L. Dinkler
ATTORNEY 3,688,909

FLOATING SELF ADJUSTING SKIMMER

BACKGROUND OF THE INVENTION

It is known in the art to provide mechanisms to remove or skim a layer of immiscible liquid, for example hydrocarbons, from a water surface. The most rudimentary skimmer is of the stationary type which must be adjusted up and down to accommodate changes in liquid level. More efficient skimmers are of the floating type which inherently accommodate changes in liquid level. One variety of floating skimmers include a pivotally mounted receptacle having a weir which is buoyed to position the weir adjacent the interface of the liquid to be skimmed. Exemplary skimmers of this variety are shown in U.S. Pat. Nos. 2,608,300 and 2,670,848.

Without further modification, these skimmers are not adapted for use as a free floating skimmer in a body of water sufficiently large to be subject to currents or waves. It would seem that the skimmers disclosed in the aforementioned patents could be provided with a simple buoyant platform and operate without difficulty in a body of moving water. Such was discovered not to be the case, however, since one side of the platform would invariably dip into the oncoming water and then submerge entirely. When the leading edge of the platform dipped into the oncoming water, it was found that the platform acted much like a foil and planed downwardly.

SUMMARY OF THE INVENTION

The skimmer of the invention comprises a buoyant platform, a receptacle having a weir pivotably mounted on the platform, buoyant means for pivoting the receptacle to position the weir adjacent the interface of the liquids, an intake conduit extending into the receptacle for removing liquids accumulated therein and means for stabilizing the platform and substantially preventing submergence of the weir into the water.

It is an object of this invention to provide a free floating skimmer for removing one liquid from the surface of another liquid including a buoyant platform and means for stabilizing the platform.

Another object of the invention is to provide a floating skimmer having a pivotally mounted receptacle defining a weir and means for stabilizing the platform and substantially preventing submergence of the weir into the water as a result of water movement.

Another object of the invention is to provide a floating skimmer comprised of a rotatable drum having a weir which is buoyantly positioned adjacent the interface of the liquid to be skimmed.

DESCRIPTION OF THE PREFERRED EMBODIMENTS

Figure 1:
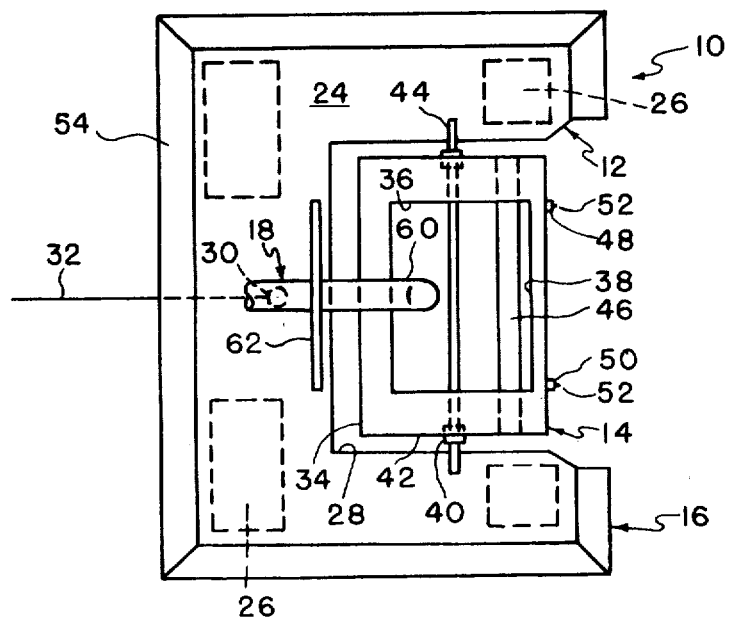
FIG. 1 is a top plan view of a skimmer constructed in accordance with the principles of this invention.
Figures 2, 3:
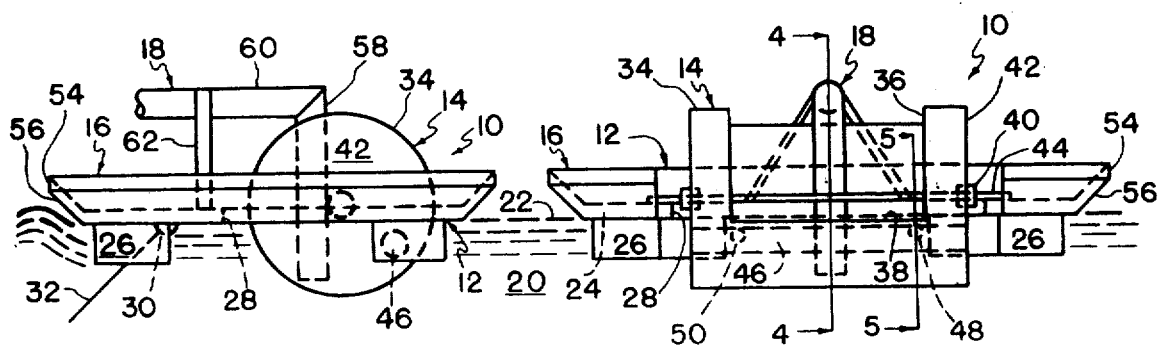
FIG. 2 is a side elevational view of the skimmer of FIG. 1.
FIG. 3 is a front elevational view of the skimmer of FIGS. 1 and 2.

Attention is directed to FIGS. 1 - 3 wherein there is shown a skimmer 10 having as major components a buoyant platform 12, a pivotable receptacle 14, stabilizing means 16 and liquid removal means 18. As shown in FIG. 2, the skimmer 10 is positioned on a body of water 20 having a layer of immiscible liquid 22 thereon. Although the invention is described in the situation where the liquid 22 is a hydrocarbon, e.g. fuel oil, diesel oil, crude oil and the like, it will be apparent that the invention is not so limited.

The platform 12 comprises a deck 24 made of any suitable material to which is secured a plurality of floats 26 which may also be of any suitable material. The deck 24 defines a recess 28 on one side of the platform 12 in which the receptacle 14 is located. A suitable connection 30 is provided on the platform 12 for attachment to a line 32 extending to an anchor or deadman to tether the skimmer 10 at a desired location. It will be apparent that the use of two or more divergent anchor lines may be preferred under some circumstances.

The receptacle 14 comprises a cylindrical drum 34 from which a window 36 has been cut defining a weir 38 adjacent the open side of the recess 28. As shown best in FIG. 4, the window 36 occupies the upper right quadrant and a part of the upper left quadrant of the drum 34. It will be seen that liquids are prevented from entering the drum 34 opposite from the weir. A bushing 40 is secured, as by welding, to each end wall 42 of the drum 34 along the axis thereof. A rod 44 loosely fits in the bushings 40 and extends through the drum 34. The free ends of the rod 44 are secured, as by welding, to the deck 24. It will be seen that there is provided means for pivoting the drum 34 about the longitudinal axis thereof to position the weir 38 adjacent the interface of the liquids 20, 22.

The drum 34 is preferably of moderate size having a small moment of inertia about the longitudinal axis thereof. If the drum 34 has a substantial moment of inertia, buoyant and gravitational forces applied thereto must be large in order to move the weir 38. Furthermore, the reaction time between the application of such forces and movement of the weir 38 may be so long as to preclude efficient skimming in a body of water having substantial wave movement. For these reasons, it is preferred that the drum 34 be a 55 gallon drum, by which is meant that the drum 34 be approximately the size of a conventional 55 gallon drum.

Figure 4:
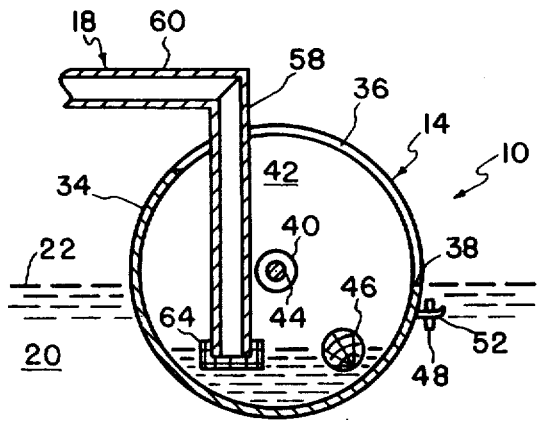
FIG. 4 is an enlarged cross sectional view of the device of FIG. 3 taken substantially along line 4 — 4 as viewed in the direction indicated by the arrows.
Figure 5:
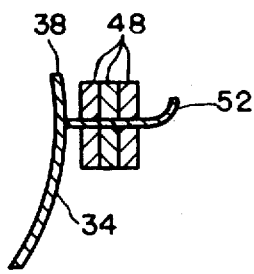
FIG. 5 is an enlarged partial cross sectional view of FIG. 3 taken substantially along line 5 — 5 thereof as viewed in the direction indicated by the arrows.

A buoyant member 46 is located in a compartment defined by the drum 34 below the weir 38 as shown best in FIG. 4. The buoyant member 46 is preferably solid to obviate splitting of a buoyant container caused by impact or the freezing of a liquid therein. The buoyant member 46 may, for example, be wood and is preferably a log or timber secured to the end walls 46 as by nailing. The buoyant member 46 is secured between a vertical plane passing through the rod 44 and a vertical plane passing through the weir 38. It will be seen that the weight of the buoyant member 46 imparts a clockwise moment to the drum 34 tending to depress the weir 38. It will also be seen that the buoyancy of the member 46 imparts a counterclockwise moment to the drum 34 tending to elevate the weir 38.

It is accordingly apparent that the gravitational moment exceeds the buoyant moment when insufficient liquid is accumulated in the drum 34 thereby depressing the weir 38 and allowing greater liquid flow into the drum 34. When an excessive amount of liquid is accumulated in the drum 34, the buoyant moment exceeds the gravitational moment thereby elevating the weir 38 and decreasing the liquid flow into the drum 34. For a number of reasons it is desirable to have the capability to adjust the balance between gravitational and buoyancy induced moments. For example, the layer 22 to be skimmed may be quite thick requiring that the weir 38 be depressed to a greater extent. Similarly, the layer 22 may be quite thin making it desirable to elevate the weir 38 slightly and avoid processing substantial amounts of the underlying water. In addition, the density of the liquid 22 may vary from design parameters thereby affecting the buoyancy of the member 46. The use of a solid buoyant material such as wood necessarily means that the buoyancy of the member 46 cannot be accurately controlled in a convenient manner.

There is accordingly provided a plurality of weights 48, 50 removably attached to the drum 34 in any suitable manner, as by the provision of a hook 52 attached to the drum 34 on which the weights 48, 50 may be placed. As illustrated, the weights 48, 50 increase the gravitational moment imparted to the drum 34. It will be apparent that the weights 48, 50 may be placed on the opposite side of the rod 44 to increase the buoyant moment if the buoyant member 46 is properly positioned.

The stabilizing means 16 comprises a member 54 extending beyond the periphery of the platform 12 along a substantial portion of the external periphery thereof. The stabilizing member 54 presents an upwardly inclined downwardly facing surface 56 to the moving liquids 20, 22. If the leading edge of the stabilizing member 54 is depressed into the oncoming moving water, the surface 56 acts to elevate the leading portion of the platform 12. This effect of the stabilizing member 54 occurs because of the impact of the moving water thereagainst which may be in the form of current or waves.

The liquid removal means 18 comprises a vertical conduit section 58 extending through the window 36 into the compartment defined by the drum 34. The conduit section 58 is connected to a horizontal conduit 60 which is supported by a bracket 62 affixed to the deck 24. The horizontal conduit is connected in any suitable fashion to a pump (not shown) for removing liquids accumulated in the drum 34.

Positioned on the lowermost end of the conduit 58 is a foraminous member 64 which may be a perforated sleeve but which is preferably a screen. The screen 64 prevents flotsam from entering the conduit 58 thereby obviating damage to the pump. It would appear more advantageous to position a screen over the weir 38 and thereby prevent flotsam from entering the drum 34. In practice, this approach has not proved practicable. Experience has shown that marine grasses, which are of substantial length and of minimal width, tend to orient in a horizontal fashion upon such a screen in a relatively brief period of time. An impermeable mat soon forms immediately above the weir 38 which causes an insufficient amount of liquid to pass into the drum 34. The balance between gravitational and buoyant moments in the drum 34 is soon upset thereby depressing the weir 38 exposing a fresh part of such a screen which in turn becomes clogged with marine grasses. Soon the skimmer 10 must be deactivated and the grasses removed from adjacent the weir 38.

It has been found that the period of uninterrupted operation of the skimmer 10 may be increased substantially by allowing the marine grasses and other flotsam to collect in the drum 34. Since the grasses are of substantial length, they are unable to completely wrap around the screen 64 and consequently do not mat so readily.

When the skimmer 10 is initially placed in operation, the drum 34 is empty so that the gravitational moment of the member 46 substantially exceeds the buoyant moment thereof. It will be apparent that contact between the buoyant member 46 and the conduit 58 or contact between the conduit 58 and the window 36 maintains the buoyant member 46 on the right side of the vertical plane passing through the rod 40 as seen in FIG. 4. The weir 38 is consequently substantially depressed so that a substantial amount of water passes thereover into the compartment adjacent the screen 64. Although liquids are being removed through the conduit 58, substantially more liquids enter the drum 34 than depart. Accordingly, the liquid level in the drum 34 rises thereby increasing the buoyant moment of the member 46 until it exceeds the gravitational moment. The drum 34 then commences rotation in a counterclockwise direction to elevate the weir 38 and decrease the amount of liquids drawn into the drum 34. In the event the weir 38 is excessively elevated, the amount of liquid being withdrawn from the drum 34 exceeds the amount passing over the weir 38 such that the liquid level in the drum 34 begins to lower. The buoyant moment acting on the member 46 declines and the weir 38 subsides. After a short period of time, the weir 38 becomes fairly stationary.

If too much water is being withdrawn through the conduit 58, one or more of the weights 48, 50 may be removed from the hooks 52 to elevate the weir 38. Similarly, if a substantial amount of the liquid 22 remains on the surface of the liquid 20, one or more weights 48, 50 may be added to the hooks 52 to depress the weir 38. It will be seen that the removable weights 48, 50 enable the skimmer 10 to be used to skim thin or thick layers of the liquid 22 from the body of water 20.

Tests conducted in calm water with the skimmer 10 showed the following results:

| Oil Thickness Inches | Total Liquid Removal GPM | Oil Removal GPM |
|---|---|---|
| 0.3[1] | 68 | 5 |
| 0.3[1] | 92 | 7 |
| 0.4[1] | 58 | 8 |
| 1/4 – 1/2[2] | 48 | 35–44 |
| 1/3 – 1/2[2] | 44 | 25–37 |

[1] NO. 2 Diesel Oil
[2] No. 6 Fuel Oil

Tests conducted in a wave tank revealed that the skimmer 10 functioned adequately in waves up to two feet high, spaced 8 feet apart.

Figure 6:
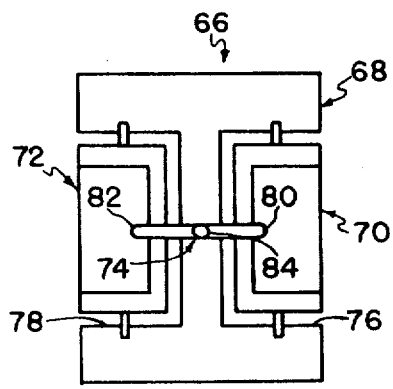
FIG. 6 is another embodiment of the invention.

REferring now to FIG. 6, there is shown another skimmer 66 comprised of a platform 68, a pair of receptacles 70, 72 and a liquid removal means 74. The platform 68 is generally H-shaped having outwardly facing recesses 76, 78 receiving the receptacles 70, 72. The receptacles 70, 72 are substantially identical to the receptacle 14 with the weirs thereof facing the open sides of the recesses 76, 78.

The liquid removal means 64 includes a vertical conduit 80, 82 extending into the receptacles 70, 72 and connected to a common suction conduit 84 leading to a pump (not shown). An important advantage of the skimmer 66 is its capacity to skim about twice the liquids as the skimmer 10. Since the receptacles 70, 72 may be of the same size as the receptacle 14, the inertia thereof is substantially the same. Another advantage of the skimmer 66 is its capability for removing liquids from both directions. It will be apparent that this is particularly advantageous when the body of water is moving substantially parallel to the axis of the receptacles.

Figure 7:
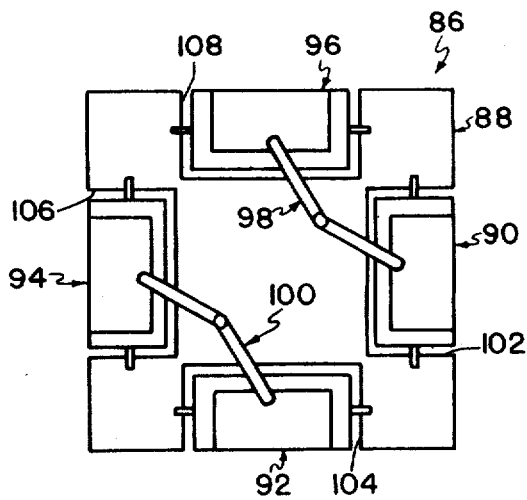
FIG. 7 is still another embodiment of the invention.

Referring to FIG. 7, another skimmer 86 is illustrated comprising a platform 88, four receptacles 90, 92, 94, 96 and a pair of liquid removal means 98, 100. The platform 88 comprises four recesses 102, 104, 106, 108 in which the receptacles are placed. The receptacles 90, 92, 94, 96 are substantially identical to the receptacle 14 and need not be further described except to say that the weirs of each of the receptacles face toward the open side of the associated recess.

The liquid removal means 98, 100 are each substantially the same as the liquid removal means 74 shown in FIG. 6. It will be apparent that the capacity of the skimmer 86 is twice that of the skimmer 66 and has the capability of skimming liquids from any direction.

We claim:

1. A floating skimmer for use on a body of liquids for skimming a first liquid overlying a second liquid comprising a buoyant platform provided with a recess on at least one side thereof;

a receptacle positioned in the recess having a weir on one side thereof and a compartment below the weir for collecting liquids passing thereover;

means movably mounting the receptacle on the platform for adjusting the weir in a generally up and down direction by pivoting the receptacle about its axis;

buoyant means in the compartment and secured below the weir to the receptacle for moving the weir upwardly by imparting a buoyant moment thereto upon excessive filling of the compartment and for moving the weir downwardly by a gravitational moment upon insufficient filling of the compartment;

position adjusting means coordinating with the buoyant means for adjusting the position of the receptacle comprising weights removably attached to a wall of the receptacle away from the pivot axis thereof;

an intake conduit, for connection to a pump, extending into the compartment for removing liquids accumulated therein; and means stabilizing the platform for substantially preventing submergence thereof caused by movement of the liquids, the stabilizing means comprising a member extending beyond the periphery of the platform along a substantial portion thereof presenting an upwardly inclined downwardly facing surface to the moving liquids.

2. The floating skimmer of claim 1 further comprising a foraminous member on the open end of the intake conduit for preventing ingress of flotsam thereinto.

3. The floating skimmer of claim 1 wherein the buoyant means comprises a solid buoyant member.

4. The floating skimmer of claim 1 wherein the receptacle comprises a 55 gallon drum and the pivotable mounting means mounts the 55 gallon drum for pivotal movement about the axis thereof.

5. The floating skimmer of claim 1 further comprising a second receptacle having a weir and a compartment below the weir for receiving liquids passing therethrough;

means pivotably mounting the second receptacle on another side of the platform for adjusting the position of the weir;

buoyant means in the compartment of the second receptacle and secured to the second receptacle for pivoting the same to position the weir adjacent the interface of the liquids; and a second intake conduit, for connection to a pump, extending into the compartment of the second receptacle for removing liquids accumulated therein.

6. The floating skimmer of claim 5 wherein the platform is of generally quadrilateral outline providing a recess on opposite sides thereof; and the first and second receptacles are positioned in the recesses.

7. The floating skimmer of claim 5 wherein the platform is of generally quadrilateral outline providing a recess on adjacent sides thereof; and the first and second receptacles are positioned in the recesses.

8. The floating skimmer of claim 1 wherein the stabilizing member extends substantially continuously along the periphery of the unrecessed portion of the platform.

9. The floating skimmer of claim 1 wherein the lower portion of the stabilizing member is secured to the platform substantially at the water line.

* * * * *